United States Patent [19]

Chisholm

[11] 4,135,542
[45] Jan. 23, 1979

[54] DRAIN DEVICE FOR COMPRESSED AIR LINES

[76] Inventor: James R. Chisholm, 771 Coral Dr., Cape Coral, Fla. 33904

[21] Appl. No.: 832,591

[22] Filed: Sep. 12, 1977

[51] Int. Cl.$^2$ .................. B01D 53/04; F16T 1/45; F16K 24/04
[52] U.S. Cl. .................. 137/204; 55/212; 55/432; 55/DIG. 17; 137/624.13; 222/368
[58] Field of Search ............ 55/212, 215, 428, 432, 55/433, DIG. 17; 137/204, 203, 587, 624.13; 210/114, 307, 312, 417; 222/368, 442, 444

[56] References Cited

U.S. PATENT DOCUMENTS

| | | | |
|---|---|---|---|
| 578,718 | 3/1897 | Buford | 222/368 X |
| 589,775 | 9/1897 | Akeson | 222/368 |
| 1,438,595 | 12/1922 | Hale | 222/368 X |
| 1,689,096 | 10/1928 | Wray et al. | 222/442 X |
| 3,065,884 | 11/1962 | Papazian | 222/368 X |
| 3,077,272 | 2/1963 | Reinhall | 222/368 X |
| 3,201,007 | 8/1965 | Transeau | 222/368 X |
| 3,426,508 | 2/1969 | McGrath | 55/428 X |

FOREIGN PATENT DOCUMENTS

| | | | |
|---|---|---|---|
| 9633 | 10/1932 | Australia | 222/442 |
| 1332644 | 10/1973 | United Kingdom | 222/444 |

Primary Examiner—Robert H. Spitzer
Attorney, Agent, or Firm—O'Brien, Clarence A.; Harvey B. Jacobson

[57] ABSTRACT

A drain device that removes oil, water, sludge and other contaminants from compressed air systems comprising a cylindrical housing for attachment between diametrically opposed compressed air and drain lines, a cylindrical rotor rotatably journalled within the housing, a single port, at least as large as the inside diameter of the air line, through the wall of the rotor, the port being positioned for sequential alignment with the air and drain lines, when the rotor is actuated and a pair of bleeder valves between the interior chamber of the rotor and the atmosphere including respective cam tracks positioned on end walls of the rotor and housing to open the valves when the rotor port is aligned with the discharge line.

9 Claims, 6 Drawing Figures

DRAIN DEVICE FOR COMPRESSED AIR LINES

BACKGROUND OF THE PRESENT INVENTION

One of the principal problems with currently used drain devices for compressed air lines is the substantial air leakage and clogging by rust particles, etc., created by the filtering processes employed to remove water, oil and other contaminents from the compressed air systems.

Therefore, one of the principal objects of the present invention is to provide a drain device for compressed air lines which drains off the water, oil, rust particles and other contaminents without clogging or causing a substantial air loss in the air line.

Another object of the invention is to provide a drain device for compressed air lines that prevents air loss from the pneumatic system if for any reason the drain device is rendered inoperable.

A further object of the invention is to provide a drain device for compressed air lines that conserves energy since the air loss is minimal being equal to the volume of the collection chamber in the device which may be as little as a few cubic inches, thus saving power.

Yet another object of the invention is to provide a drain device for compressed air lines that may be operated by hand or by automatic means, an electric motor for example.

Yet another object of the invention is to provide a drain device for compressed air lines that needs to be operated from a collecting position to a drain position only once or twice per hour to completely drain an average pneumatic system.

DESCRIPTION OF A PREFERRED EMBODIMENT

Figure 1:
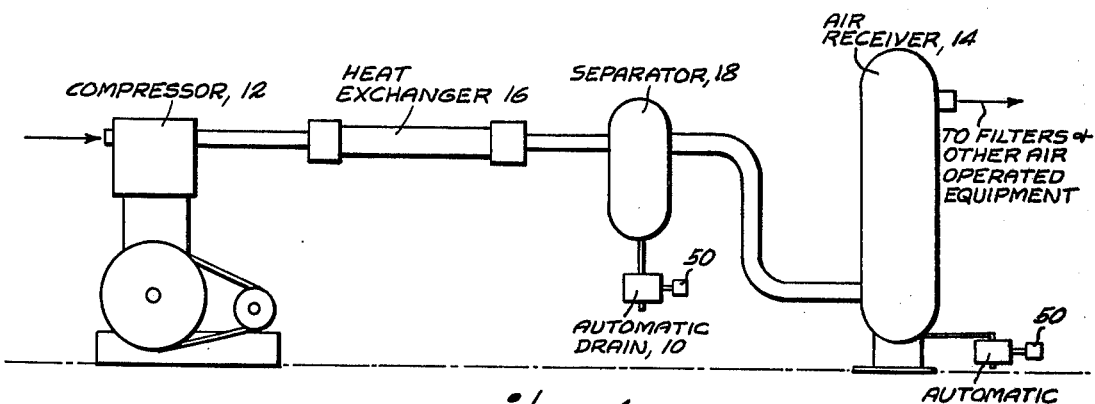
FIG. 1 is a schematic illustration of a typical pneumatic system utilizing the drain device of the present invention.

With reference to the drawings in which like reference characters designate like or corresponding parts throughout the various views and with particular reference to FIG. 1, the drain device of the present invention is designated generally at 10 and is illustrated in use with a typical pneumatic system employing a compressor 12 connecting to an air receiver 14 through a heat exchanger 16 and a separator 18. A drain device 10 of the present invention is illustrated in connection to the lower ends of the separator 18 and air receiver 14 to remove the water, oil, rust particles, sludge etc. from the compressed air in the system.

Figure 2:
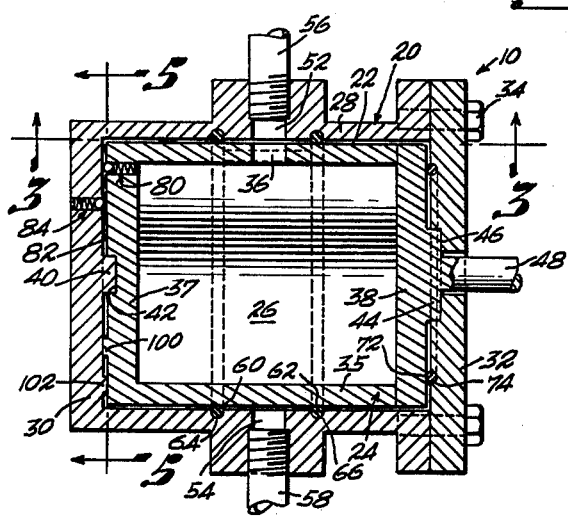
FIG. 2 is a longitudinal, vertical sectional view of the drain device of the present invention.

With reference to FIG. 2, the drain device includes a cylindrical housing 20 providing an inner cylindrical chamber 22 for reception of a cylindrical rotor 24 providing a collector chamber 26. Housing 20 includes a cylindrical wall 28, an integral or fixed first end wall 30 and a mounting plate 32 bolted at 34 to housing 20 to form a second end closure.

Rotor 24 provides a cylindrical wall 35 having a single port 36, and opposed end walls 37, 38. An axially inwardly extending pintle 40 from housing wall 30 is received in an annular recess 42 of rotor wall 37 to provide a first end journal. At its second end, rotor 24 includes an axially extending bearing portion 44 for reception in an annular recess 46 in mounting plate 32. A drive shaft 48 extends outwardly from bearing portion 44 and may include manual operating means, not shown, on its outer end or automatic actuating means such as an electric motor 50, FIG. 1, which may be timer controlled because, under ordinary circumstance, the drain device 20 need be operated only once or twice per hour, or may be continuously operated.

Housing 20 includes an inlet port 52 and an outlet drain port 54 for respective reception of inlet and drain conduits 56, 58. The conduits 56, 58 may be screw threaded as illustrated or otherwise fixed in ports 52, 54 and it should be noted that the device may be fabricated of any suitable metal or plastic material.

Figure 3:
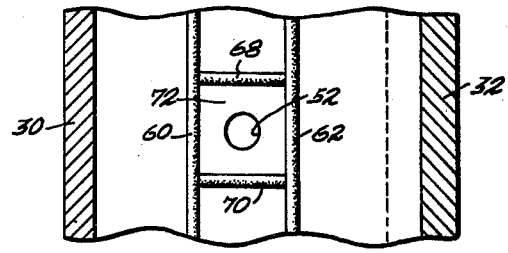
FIG. 3 is a cross sectional view taken along line 3—3 of FIG. 2, illustrating the seal means in the inner cylindrical wall of the housing of the drain device of FIG. 2.

As illustrated in FIGS. 2 and 3 a pair of seals in the form of o-rings 60, 62 are contained in circumferential grooves 64, 66 in the inside of annular housing wall 28 on the respective sides of inlet and outlet ports 52, 54. A pair of parallel longitudinal seal members 68, 70 span the distance between the o-rings 60, 62 on opposite sides of inlet port 52 to sealingly isolate a small area 72, FIG. 3, between the housing and rotor. The seal means above described prevents the escape of air pressure in the event the drain device 10 becomes inoperable for any reason. An additional seal ring 72 is disposed in an inside groove 74 in end mounting plate 32 to seal the bearing portion 44.

Figure 4:
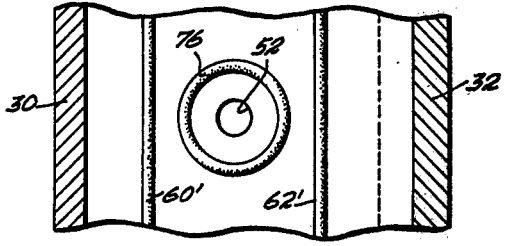
FIG. 4 is a view similar to FIG. 3, illustrating a somewhat modified seal means.
Figure 5:
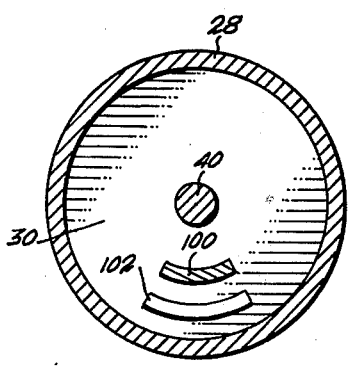
FIG. 5 is a cross sectional view taken along line 5—5 of FIG. 2.

FIG. 4 shows a modified form of seal means employing a pair of circumferential o-rings 60', 62' on the respective sides of ports 52, 54 between the housing wall 28 and the rotor wall 35 and an o-ring 76 circumferentially disposed about inlet port 52.

Figure 6:
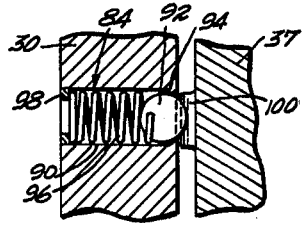
FIG. 6 is an enlarged sectional view of a typical bleeder valve utilized between the collector chamber of the device and the atmosphere.

Bleeder valve means are provided between the collector chamber 26 and the atmosphere to vent chamber 26 to prevent a vacuum build up therein. A first spring loaded ball valve 80 opens between collector chamber 26 and the space 82 between the rotor 24 and housing 20, and a second spring loaded ball valve 84 opens between the space 82 and the atmosphere. Both ball valves 80 and 84 being similar, valve 84 will be described relative to FIG. 6.

A bore 90 is provided through housing wall 30. A ball 92 in the bore 90 is normally restrained against movement by a valve seat 94 formed about the inner periphery of bore 90 and a compression spring 96 positioned between ball 92 and a ring 98 press fitted in the outer end of the bore 90. A raised cam segment 100 on the outer surface of rotor wall 37 is positioned to unseat valve ball 92 when the single rotor port 36 is aligned with the drain port 54. A similar raised cam segment 102 on the inner surface of housing wall 30 is positioned to simultaneously open ball valve 80 to vent the collector chamber 26 to the atmosphere each time the rotor 24 is rotated to aline the port 36 therein with the drain port 54 to discharge an accumulation of contaminents from collector chamber 26. Inlet and drain ports 52 and 54 are of a diameter at least as large as the inside diameter of inlet and drain conduits 56 and 58 to prevent a build up of rust particles, sludge and other contaminents therein.

Port 36 is normally in alignment with inlet port 52 to permit all contaminents to pass into the collector chamber 26 from the compressed air conduit 56. When the rotor 24 is rotated to align port 36 with discharge port 54, the collector chamber empties and the rotor is returned to its normal collection position.

This device may also be used for removing condensate from steam lines.

I claim:

1. An automatic drain device in combination with a compressed air conduit in a pneumatic system in a position to remove water, oil, rust particles and other contaminants therefrom comprising, a cylindrical housing providing a cylindrical wall and first and second end walls defining an inner chamber, an inlet port through said cylindrical wall for connection to the compressed air conduit and an outlet drain port, a cylindrical rotor axially rotatably journalled within said housing inner chamber providing a cylindrical wall and first and second end walls defining an inner collector chamber, and a single port through said cylindrical wall in a position for sequential alignment with said inlet and outlet ports, said rotor being reduced in size relative to said housing inner chamber to define a slight space between said housing and rotor walls, means to automatically rotate said rotor to sequentially position said single port with said inlet and outlet ports at predetermined time intervals;

valve means comprising a first normally closed spring loaded ball valve extending through said rotor first end wall and a second normally closed spring loaded ball valve extending through said housing first end wall; and means to open said valve means comprising a first cam segment of a predetermined length extending inwardly from said first housing end wall into said slight space and a second cam segment of a predetermined length extending inwardly from said first end wall, said first and second cam segments being positioned and sized to simultaneously actuate said first and second spring loaded ball valves to open positions when said single port is in general alignment with said outlet port.

2. The drain device as defined in claim 1 wherein said inlet and outlet ports are positioned in a diametrically opposite relation and the axis of said inlet, outlet and single ports be in a generally common vertical plane.

3. The drain device as defined in claim 2 including seal means in said slight space between said housing and rotor cylindrical walls.

4. The drain device as defined in claim 3 wherein said seal means includes a pair of o-rings disposed in a vertical parallel relation around and between said housing and rotor cylindrical walls on opposed sides of said common plane.

5. The drain device as defined in claim 4 including a pair of horizontal seal members spanning the distance between said parallel o-rings in a parallel spaced apart relation on opposed sides of said inlet port.

6. The drain device as defined in claim 4 wherein said seal means includes an o-ring disposed between said housing and rotor annular walls outwardly of and about said inlet port.

7. The drain device as defined in claim 3 including a drive shaft axially connecting to said rotor and extending outwardly through said housing second end wall for rotational operation by any type of appropriate operating means.

8. The drain device as defined in claim 7 wherein said seal means includes an o-ring disposed between said housing and rotor second end walls and outwardly of and about said drive shaft.

9. The drain device as defined in claim 1 wherein the diameters of said inlet, outlet and single ports are at least as large as the diameter of the compressed air conduit.

* * * * *